(12) United States Patent
Park et al.

(10) Patent No.: US 8,769,160 B2
(45) Date of Patent: Jul. 1, 2014

(54) MULTI-INTERFACE MEMORY CARD AND METHOD OF OPERATION

(75) Inventors: Sung Geun Park, Sunwon-si (KR); Chul Joon Choi, Sunwon-si (KR); Tae-Geuk Kim, Gunpo-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 195 days.

(21) Appl. No.: 13/332,545

(22) Filed: Dec. 21, 2011

(65) Prior Publication Data

US 2012/0159008 A1    Jun. 21, 2012

(30) Foreign Application Priority Data

Dec. 21, 2010    (KR) .................. 10-2010-0131904

(51) Int. Cl.
*G06F 3/00* (2006.01)
*G06F 13/26* (2006.01)

(52) U.S. Cl.
USPC .............................. 710/11; 710/14; 710/105

(58) Field of Classification Search
CPC ..................................................... G06F 1/266
USPC .............. 710/8–13, 104–105, 313, 315, 14
See application file for complete search history.

(56) References Cited

U.S. PATENT DOCUMENTS

| | | | |
|---|---|---|---|
| 7,159,132 B2* | 1/2007 | Takahashi et al. | 713/310 |
| 8,046,502 B2* | 10/2011 | Kim et al. | 710/11 |
| 8,358,100 B2* | 1/2013 | Helfrich | 320/106 |
| 2005/0021895 A1* | 1/2005 | Son et al. | 710/301 |
| 2005/0086434 A1* | 4/2005 | Kang et al. | 711/115 |
| 2007/0210174 A1* | 9/2007 | Deprun et al. | 235/492 |
| 2008/0155143 A1* | 6/2008 | Mochizuki et al. | 710/64 |
| 2008/0247015 A1* | 10/2008 | Bae et al. | 359/15 |
| 2009/0198861 A1* | 8/2009 | Lu et al. | 710/315 |
| 2012/0198101 A1* | 8/2012 | Porcella et al. | 710/15 |

FOREIGN PATENT DOCUMENTS

| | | |
|---|---|---|
| JP | 2005-284323 | 10/2005 |
| KR | 1020070092685 A | 9/2007 |
| KR | 100764744 | 10/2007 |
| KR | 1020090076230 A | 7/2009 |

\* cited by examiner

*Primary Examiner* — Christopher Shin
(74) *Attorney, Agent, or Firm* — Volentine & Whitt, PLLC

(57) ABSTRACT

A method of operating a multi-interface memory card including a first interface supporting a universal serial bus (USB) data transfer protocol and the second interface supporting an inter-chip USB (IC-USB) data transfer protocol includes; selecting either the first interface or the second interface to facilitate data communication between the multi-interface memory card and a host connected to the multi-interface memory card via a USB connection by comparing a level of a power-on voltage received from the host with a reference voltage level, and thereafter determining whether a reset signal has been received from the host.

19 Claims, 5 Drawing Sheets

MULTI-INTERFACE MEMORY CARD AND METHOD OF OPERATION

CROSS-REFERENCE TO RELATED APPLICATIONS

This application claims priority under 35 U.S.C. §119(a) from Korean Patent Application No. 10-2010-0131904 filed on Dec. 21, 2010, the subject matter of which is hereby incorporated by reference.

BACKGROUND OF THE INVENTION

Embodiments of the present inventive concept relate to a multi-interface memory cards. More particularly, the inventive concept relates to multi-interface memory cards capable of determining a data transfer protocol supported by a host according to the level of a voltage and reset signal provided by the host. The inventive concept also relates to methods of operation for such multi-interface memory cards.

Integrated circuit (IC) cards are cards in which an IC is embedded. When connected to a host such as a personal computer (PC), a digital camera, a mobile phone, a smart phone, or a portable multimedia player (PMP), the IC card is able to communicate information with the host. For example, certain IC cards communicate with a connected host according to standards defined by the Joint Technical Committee 1 (JTC1) of the International Standards Organization (ISO) and the International Electronic Committee (IEC). Unfortunately, when an IC card is adapted for use according to a single standard, it will not operate in accordance with a different standard. Accordingly, multi-interface IC cards have been developed that are capable of communicating with various hosts using one or more of a multiplicity of different standards.

SUMMARY OF THE INVENTION

Certain embodiments of the inventive concept provide a multi-interface memory card capable of readily determining what type of data transfer protocol should be used with a connected host. This determination is made in accordance with a level of a power-on voltage provided from the host and the presence/absence of a reset signal also provided by the host.

According to certain embodiments, the inventive concept provides an operating method for a multi-interface memory card, the method comprising; detecting a level of a power-on voltage received from a host and generating corresponding voltage level information, analyzing the voltage level information in response to a reset signal received from the host and providing an analysis result, and enabling one of a plurality of interfaces controlling communication between the multi-interface memory card and the host in accordance with the analysis result.

According to certain embodiments, the inventive concept provides an operating method for a multi-interface memory card, the method comprising; detecting a level of a voltage received from a host and generating voltage level information, counting a predetermined period of time in response to a clock signal, determining whether a reset signal is received from the host in the predetermined period of time, when the reset signal is not received in the predetermined period of time, disabling a first interface and a second interface, and when the reset signal is received in the predetermined period of time, analyzing the voltage level information in response to the reset signal and enabling one interface among the first interface and the second interface according to an analysis result.

According to certain embodiments, the inventive concept provides a multi-interface memory card comprising; a first interface configured to support a first data transfer protocol, a second interface configured to support a second data transfer protocol, a voltage level detector configured to detect a level of a power-on voltage received from a host via a universal serial bus (USB) connection, and generate corresponding voltage level information, a reset signal detector configured to detect a reset signal received from the host via the USB connection and generate a detection signal, and a central processing unit (CPU) configured to compare the voltage level information with reference voltage level information in response to the detection signal and enable one of the first interface and the second interface according to a result of the comparison between the voltage level information and the reference voltage level.

According to certain embodiments, the inventive concept provides a method of operating a multi-interface memory card including a first interface supporting a universal serial bus (USB) data transfer protocol and a second interface supporting an inter-chip USB (IC-USB) data transfer protocol, the method comprising; selecting either the first interface or the second interface to facilitate data communication between the multi-interface memory card and a host connected to the multi-interface memory card via a USB connection by comparing a level of a power-on voltage received from the host with a reference voltage level, and thereafter determining whether a reset signal has been received from the host.

BRIEF DESCRIPTION OF THE DRAWINGS

The above and other features and advantages of the inventive concept will become more apparent upon consideration of certain exemplary embodiments with reference to the attached drawings in which.

DETAILED DESCRIPTION OF THE EMBODIMENTS

The inventive concept will now be described in some additional detail with reference to the accompanying drawings that illustrate certain exemplary embodiments. This inventive concept may, however, be embodied in many different forms and should not be construed as being limited to only the illustrated embodiments. Rather, these embodiments are provided so that this disclosure will be thorough and complete, and will fully convey the scope of the inventive concept to those skilled in the art. Throughout the drawings like reference numbers and labels are used to indicate like or similar elements and related signals.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
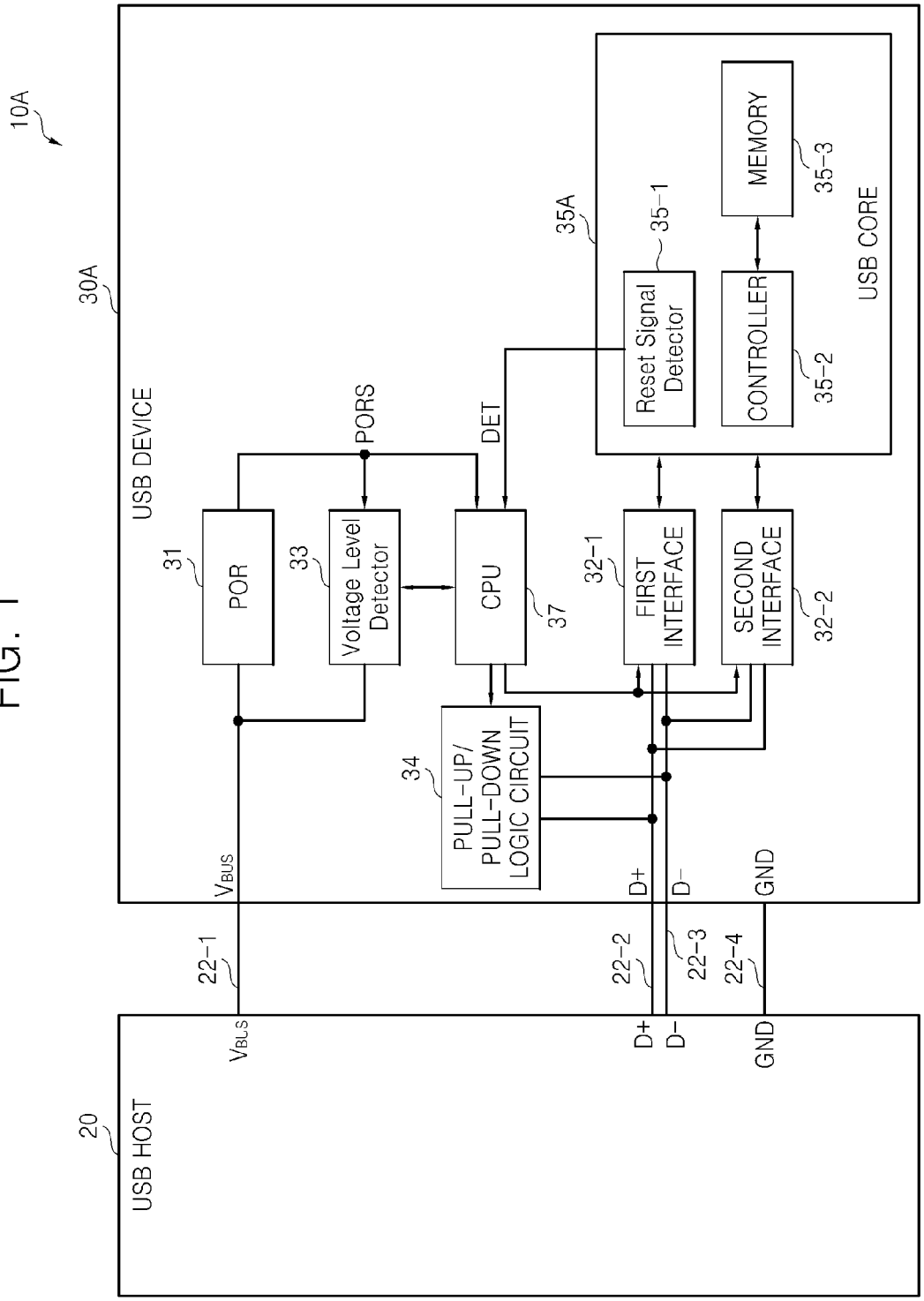
FIG. 1 is a block diagram illustrating in relevant portion a communication system according to an embodiment of the inventive concept.

FIG. 1 is a block diagram illustrating in relevant portion a communication system 10A according to an embodiment of the inventive concept. Referring to FIG. 1, the communication system 10A generally comprises a universal serial bus (USB) compatible host 20 and a connected USB compatible device 30A. In this context, the term "USB compatible" means a host or device that is capable of operation in a manner that allows communication of data according to a defined USB standard for hardware, software, firmware, and/or related data communication protocols.

The USB host 20 and USB device 30A are connected via a USB bus or USB cable to enable communication between the USB host 20 and USB device 30A using an agreed upon protocol. In certain embodiments, the USB device 30A may be implemented as an integrated circuit (IC) card, a smart card, a subscriber identity module (SIM) card, or a universal subscriber identity module (USIM) card.

In the illustrated example of FIG. 1, the USB device 30A is implemented as a multi-interface memory card and comprises a power on reset (POR) circuit 31, a first interface 32-1, a second interface 32-2, a voltage level detector 33, a pull-up/pull-down logic circuit 34, a USB core 35A, and a central processing unit (CPU) 37.

When the level of a power-on voltage received through a $V_{BUS}$ terminal is higher than a reference voltage level, the POR circuit 31 generates a power on reset signal PORS. At least one of the first interface 32-1, the second interface 32-2, the voltage level detector 33, the pull-up/pull-down logic circuit 34, the USB core 35A, and the CPU 37 may be initialized in response to the power on reset signal PORS.

It is assumed that the USB host 20 supports (i.e., operates in accordance with) a first protocol, (e.g., a USB protocol), and that the USB device 30A may communicate with the USB host 20 via the first interface 32-1 that supports the first protocol. In addition, it is further assumed that the USB host 20 supports a second protocol (e.g., an inter-chip USB (IC-USB) protocol), and that the USB device 30A may communicate with the USB host 20 via the second interface 32-2 that supports the second protocol. In the foregoing context, the term "interface" means hardware and/or software enabling operation according to a defined data transfer protocol.

The USB device (multi-interface memory card) 30A illustrated in FIG. 1 may further comprise various interfaces in addition to the first interface 32-1 and the second interface 32-2. However, for clarity of illustrative explanation, the operation of the multi-interface memory card 30A described hereafter assume a simple system that includes the first interface 32-1 and the second interface 32-2.

As noted above, the USB host 20 and the multi-interface memory card 30A are connected via a USB bus or USB cable including a plurality of signal lines (e.g., wires) 22-1 through 22-4, and a power-on voltage provided by the USB host 20 is applied to the POR circuit 31 and the voltage level detector 33 of the USB device 30A via the $V_{BUS}$ terminal. For example, when the USB host 20 supports the USB protocol, it will provide a power-on voltage having a first level (e.g., 5.0 V), as defined by the USB 1.x and 2.0 specifications to the POR circuit 31 and the voltage level detector 33 via the $V_{BUS}$ terminal. However, when the USB host 20 supports the IC-USB protocol, it will provide a power-on voltage having a second level (e.g., 1.0, 1.2, 1.5, 1.8 or 3.0 V), as defined by the addendum to the USB 2.0 specification to the POR circuit 31 and the voltage level detector 33 via the $V_{BUS}$ terminal.

The voltage level detector 33 detects the level of the power-on voltage as received via the $V_{BUS}$ terminal, generates power-on voltage detection result by comparing the received power-on voltage to a reference voltage, and then stores the detection result. For example, the voltage level detector 33 may include a latch or a memory (not shown) to store the power-on voltage detection result. This functionality provided by the voltage level detector 33 may be initialized in response to a power on reset signal PORS. In certain embodiments, the voltage level detector 33 may include an analog-to-digital converter (ADC) to generate the detection result according to a desired format or information definition.

Under the control of the CPU 37, the pull-up/pull-down logic circuit 34 pulls-up one connection terminal (e.g., a D+ terminal) among a plurality of connection terminals to a first voltage level (e.g., a power supply voltage level), and pulls-down another connection terminal (e.g., a D− terminal) to a second voltage level (e.g., ground voltage) in order to perform USB attachment sequence or IC-USB attachment sequence.

The USB core 35A, shown by way of example in FIG. 1, comprises a reset signal detector 35-1, a memory controller 35-2, and a memory 35-3. In other embodiments, however, the reset signal detector 35-1 may be provided outside the USB core 35A.

The reset signal detector 35-1 detects a reset signal received via the D+ terminal from the USB host 20 and generates a detection signal DET. The USB specification revision 2.0 and FIG. 2 may be referred to for a better understanding of reset signaling. In certain embodiments, the reset signal detector 35-1 directly receives the reset signal from the first connection terminal (e.g., D+ terminal). Alternatively, the reset signal detector 35-1 may receive the reset signal via a selected (or enabled) one of a plurality of interfaces (e.g., the first interface 32-1 or the second interface 32-2).

The memory controller 35-2 may be used to control the operation (e.g., program or write, read, and/or erase operations) for the memory 35-3 according to a command (e.g., a command output from the USB host 20) received via an enabled interface among the first interface 32-1 and the second interface 32-2. For instance, the memory controller 35-2 may control data communication between the USB host 20 and the memory 35-3.

In certain embodiments of the inventive concept, the memory 35-3 may be a non-volatile memory such as a electrically erasable programmable read-only memory (EEPROM), flash memory, or resistive memory.

The CPU 37 controls the overall operation of the USB device 30A. The CPU 37 may read the power-on voltage detection result generated by the voltage level detector 33 in response to the detection signal DET provided by the reset signal detector 35-1, analyze the detection result information, and select (or enable) either of the first and second interfaces 32-1 and 32-2 according to the analysis of the detection result. For instance, the CPU 37 may generate a control signal that selectively enables the first interface 32-1 or the second interface 32-2.

Figure 2:
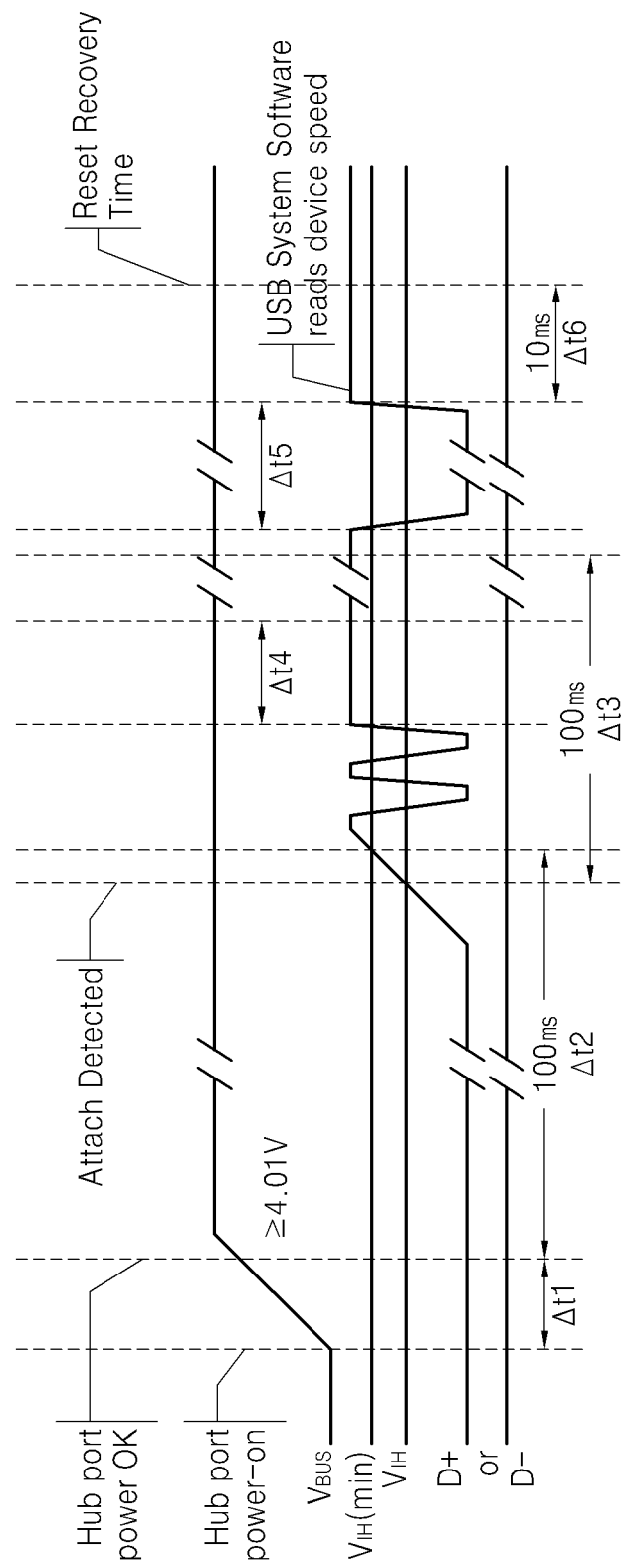
FIG. 2 is a signal timing diagram illustrating relationships between certain signals involved in connection event timing according to the Universal Serial Bus (USB) Specification Revision 2.0.

FIG. 2 is a signal diagram illustrating certain signals involved in power-on and connection event timing according to the USB Specification Revision 2.0. This USB standards document is readily available and is deemed to be conventionally understood. It should be noted, however, the reset signal used by certain embodiments of the present inventive concept is maintained by the USB host 20 at a low logic level (hereafter, "low") for a period of $\Delta t5$. For example, the USB host 20 may provide a low signal to the first connection terminal (D+ terminal) for the period of $\Delta t5$ to reset the USB device 30A. Thereafter, the USB device 30A maintains a default state.

Figure 3:
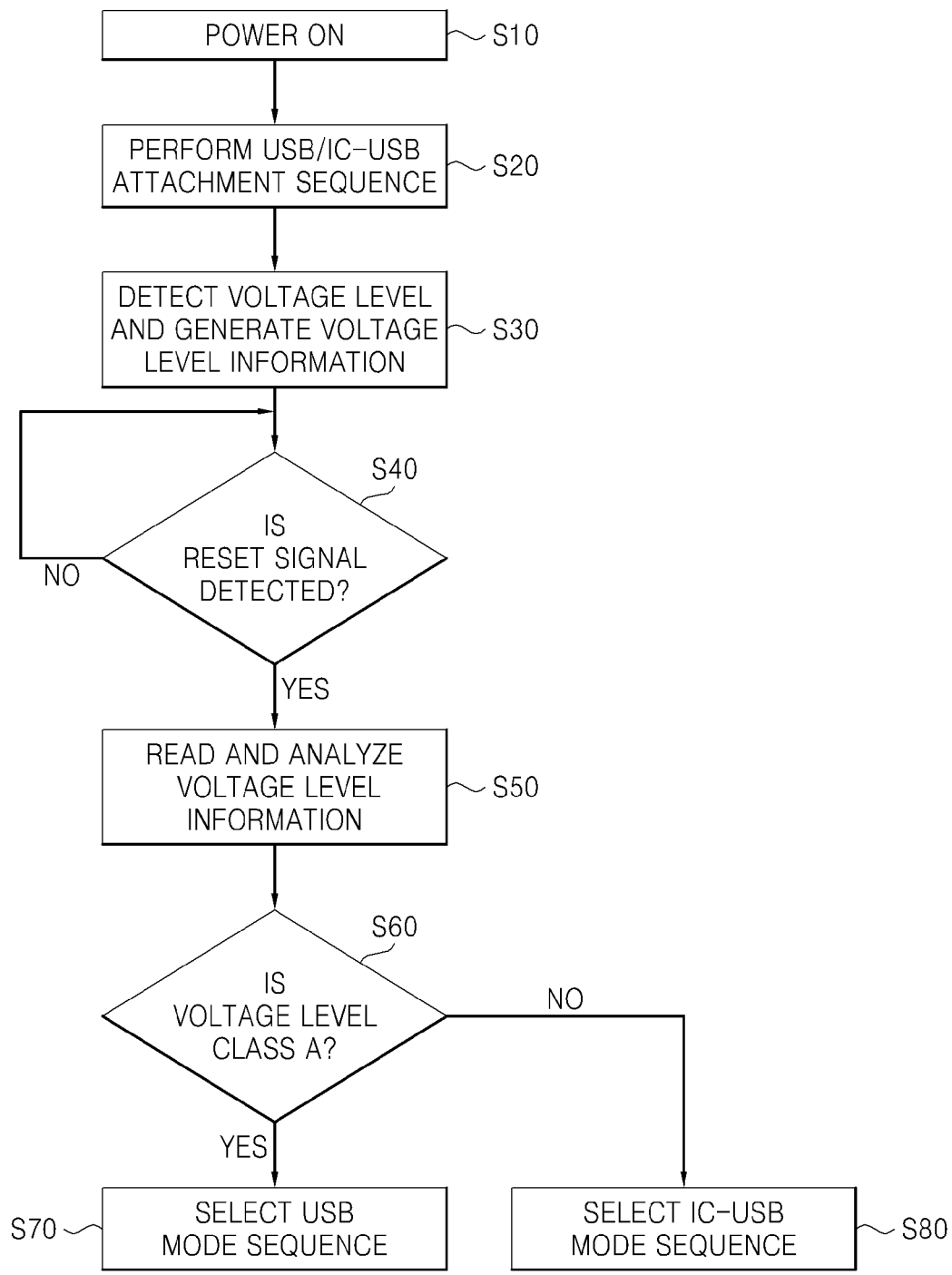
FIG. 3 is a flowchart summarizing operation of the USB device shown in FIG. 1.

FIG. 3 is a flowchart summarizing operation of the USB device 30A shown in FIG. 1. When the USB device 30A is connected with (e.g., inserted into) the USB host 20 via a USB bus or a USB cable, the USB host 20 provides a power-on voltage to the USB device 30A via the $V_{BUS}$ terminal (S10). Thus, the power-on voltage turns on the USB device 30A when it is connected. Accordingly, the USB device 30A performs the USB attachment sequence or the IC-USB attachment sequence (S20). (See, for example, FIG. 7-29 of the USB Specification Revision 2.0 and FIG. 2).

The voltage level detector 33 detects the level of the applied power-on voltage received via the $V_{BUS}$ terminal and generates "voltage level information" consistent with the detection results (S30). The reset signal detector 35-1 then detects a reset signal received via a first connection terminal (the D+ terminal) (S40), and outputs a corresponding detection signal DET to the CPU 37. The CPU 37 then reads and analyzes the voltage level information generated by the voltage level detector 33 in response to the detection signal DET (S50).

For example, when the USB host 20 supports the USB protocol, the USB host 20 will provide a power-on voltage having a first level (e.g., 5.0 V), as defined by the USB 1.x and 2.0 specifications. Accordingly, the voltage level detector 33 generates the voltage level information corresponding to 5.0 V. The CPU 37 then analyzes the voltage level information and determines whether the level of the voltage received via the $V_{BUS}$ terminal is Class A (i.e., 5.0 V as indicated by comparison with a reference voltage) (S60).

When it is determined that the level of the power-on voltage received via the $V_{BUS}$ terminal is Class A, the CPU 37 recognizes that the USB host 20 supports the USB data transfer protocol and generates a control signal enabling the first interface 32-1 and disabling the second interface 32-2 according to the recognition result.

In other words, the CPU 37 selects a USB mode sequence (e.g., an operating mode for communicating data according to the USB protocol) (S70), so that the USB host 20 can access the USB core 35A through the first interface 32-1 which has been enabled. As a result, the USB host 20 may transmit data to and received data from the memory 35-3 through the first interface 32-1 and the memory controller 35-2. At this time, transmission of data may be accomplished using conventionally understood data packets and differential signaling via the first and second connection terminals (e.g., the D+ terminal and D− terminal).

Alternately, when the USB host 20 supports the IC-USB data transfer protocol, the USB host 20 provides a power-on voltage having a second level (e.g., 1.0, 1.2, 1.5, 1.8 or 3.0 V), as defined by the addendum to the USB 2.0 specification to the voltage level detector 33 via the $V_{BUS}$ terminal. Accordingly, the voltage level detector 33 generates corresponding voltage level information.

The CPU 37 analyzes the voltage level information and determines whether the level of the voltage received through the $V_{BUS}$ terminal is Class A (i.e., 5.0 V0 (S60). For example, the CPU 37 compares the voltage level information with reference voltage level information (e.g., information corresponding to 5 V) and outputs a control signal according to a comparison result.

When it is determined that the level of the power-on voltage received via the $V_{BUS}$ terminal is not Class A, the CPU 37 recognizes that the USB host 20 supports the IC-USB data transfer protocol and generates a control signal disabling the first interface 32-1 and enabling the second interface 32-2 according to a recognition result. In other words, the CPU 37 selects an IC-USB mode sequence (e.g., an operating mode for transmitting data according to the IC-USB data transfer protocol) (S80), so that the USB host 20 may access the USB core 35A via the second interface 32-2 which has been enabled. As a result, the USB host 20 can transmit data to and received data from the memory 35-3 through the second interface 32-2 and the memory controller 35-2.

According to the foregoing embodiments of the inventive concept, the USB device 30A enables either of the first and second interfaces 32-1 and 32-2 according to whether a reset signal has been received via a first connection terminal (the D+ terminal) and according to the level of the power-on voltage received via the $V_{BUS}$ terminal. Consequently, USB devices like the USB device 30A of FIG. 1 may readily identify a data transfer protocol to be used with the USB host 20, and select an appropriate interface for the data transfer protocol from among multiple available interfaces.

Figure 4:
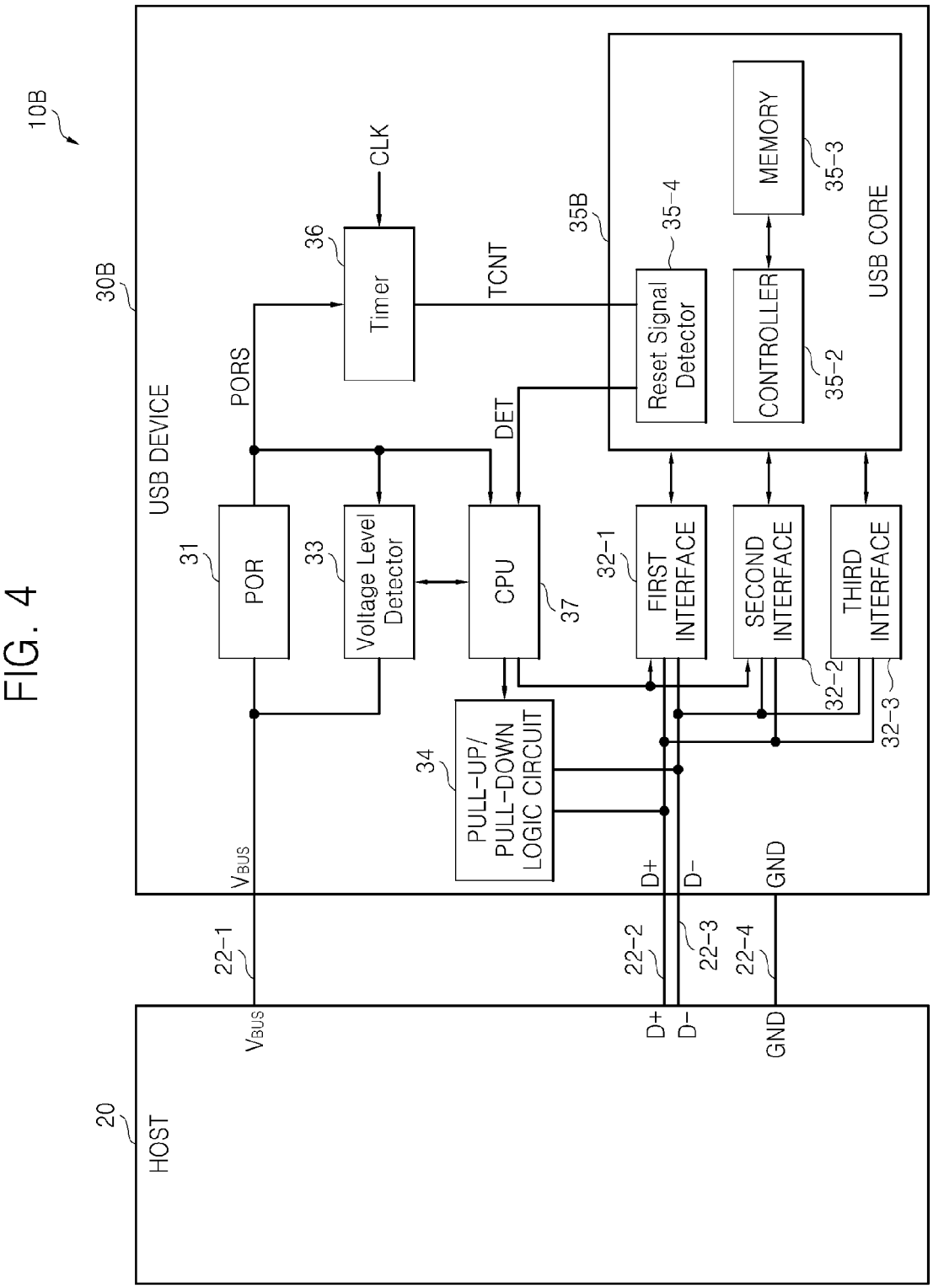
FIG. 4 is a block diagram illustrating in relevant portion a communication system according to another embodiment of the inventive concept.

FIG. 4 is a block diagram illustrating a communication system 10B according to another embodiment of the inventive concept. Referring to FIG. 4, the communication system 10B generally comprises the USB host 20 and a USB device 30B.

The USB device 30B, which may be implemented as a multi-interface memory card, includes the POR circuit 31, the first interface 32-1 supporting the USB data transfer protocol, the second interface 32-2 supporting the IC-USB data transfer protocol, a third interface 32-3 supporting a third data transfer protocol, the voltage level detector 33, the pull-up/pull-down logic circuit 34, a USB core 35B, a timer 36, and the CPU 37. In certain embodiments, the third data transfer protocol may be an International Standards Organization (ISO) 7816 or a Single Wire Protocol (SWP).

The structure of the USB device 30B shown in FIG. 4 is substantially similar to that of the USB device 30A of FIG. 1, except for the USB core 35B and the timer 36. The timer 36 may be used for initialization purposes in response to the power on reset signal PORS output from the POR circuit 31. For example, at least one of the first interface 32-1, the second interface 32-2, the third interface 32-3, the voltage level detector 33, the pull-up/pull-down logic circuit 34, the USB core 35B, the timer 36, and the CPU 37 may be initialized in response to the power on reset signal PORS.

The timer 36 is used to provide a reference clock signal used to detect a reset signal. For example, the timer 36 may generate a control signal TCNT used to enable a reset signal detector 35-4 during a reference time period and to disable the reset signal detector 35-4 outside the reference time period.

As before, the reset signal detector 35-4 may generate the detection signal DET having different levels according to whether the reset signal is detected in relation to the operation of the timer 36. According to the level of the detection signal DET, the CPU 37 determines whether the USB host 20 connected with the USB device 30B supports the USB data transfer protocol, the IC-USB data transfer protocol, or the third data transfer protocol.

A start point for the reference time period controlled by the timer 36 may vary with design and application. For example, the start point may be set in relation to period Δt3, period Δt4, or period Δt5 shown in the timing signal diagram of FIG. 2. The timer 36 may count a predetermined period beginning at the start point in response to an applied clock signal CLK to generate the control signal TCNT that controls operation of the reset signal detector 35-4 according to the corresponding count result. The reset signal detector 35-4 may then determine whether a reset signal is received during the predetermined period of time established by the control signal TCNT, and output the detection signal DET having different levels according to a result of the determination.

Hereinafter, for clarity of the description, it is assumed that the start point is set to the period Δt5.

Figure 5:
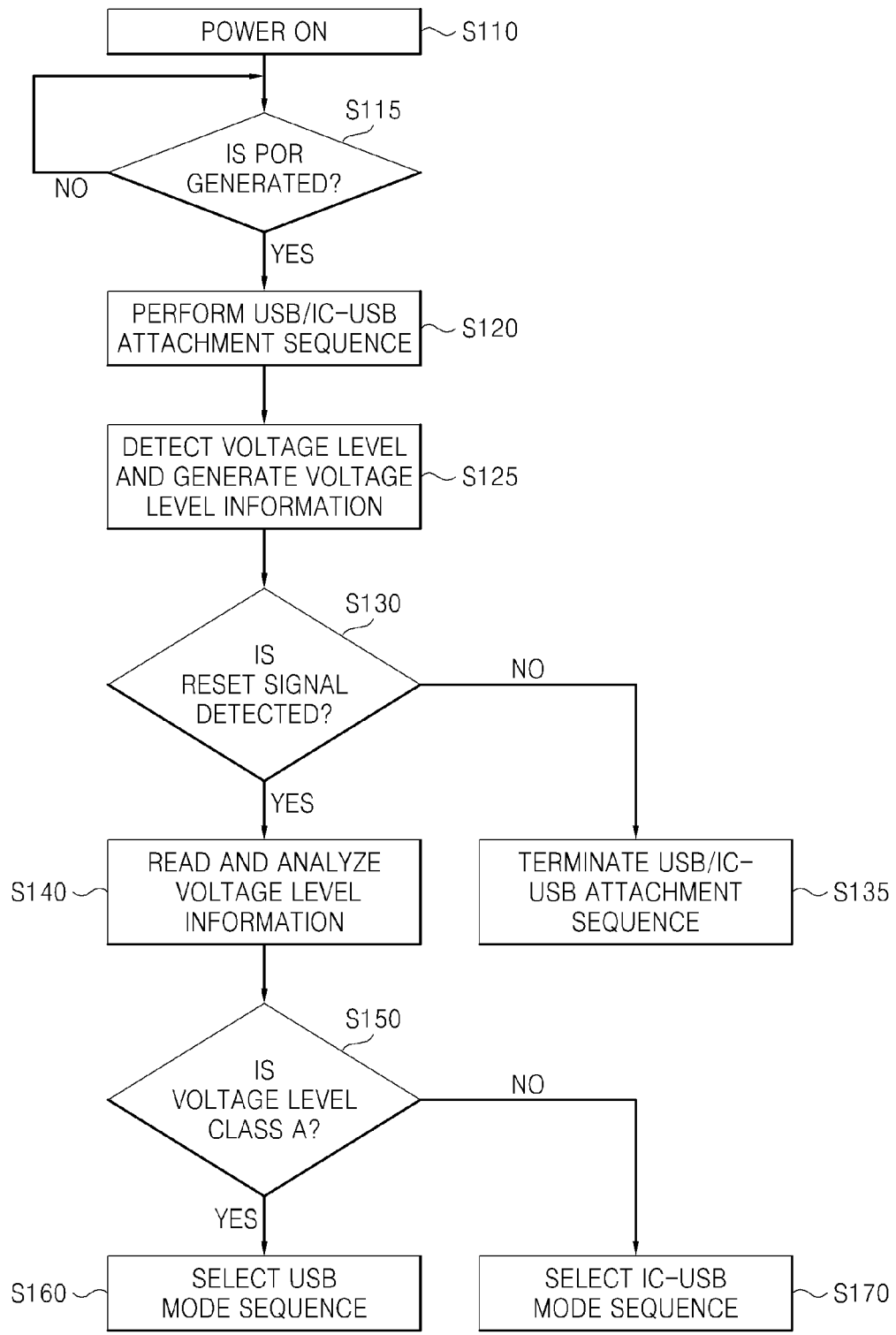
FIG. 5 is a flowchart summarizing operation of the USB device illustrated in FIG. 4.

FIG. 5 is a flowchart summarizing the operation of the USB device 30B of FIG. 4. Since the USB device or a multi-interface memory card 30B includes the third interface 32-3 in addition to the first and second interfaces 32-1 and 32-2, the first and second interfaces 32-1 and 32-2 may be enabled even when the USB host 20 connected with the USB host 20 supports the third data transfer protocol. As a result, power is consumed by the first and second interfaces 32-1 and 32-2.

When the USB host 20 supports the third data transfer protocol, the multi-interface memory card 30B needs to disable the first and second interfaces 32-1 and 32-2.

Referring to FIGS. 2, 4, and 5, when the USB device 30B is connected with (e.g., by insertion into) the USB host 20, the USB host 20 provides the power-on voltage to the USB device 30B via the $V_{BUS}$ terminal (S110). In other words, power is applied to the USB device 30B. When the power on reset signal PORS is generated by the POR circuit 31 (S115), the USB device 30B performs the USB attachment sequence or the IC-USB attachment sequence (S120). (See, e.g., FIG. 7-29 in the USB Specification Revision 2.0 and FIG. 2). At this time, the timer 36 starts counting in response to the clock signal CLK.

The voltage level detector 33 detects the level of the power-on voltage received via the $V_{BUS}$ terminal and generates voltage level information according to a detection result (S125). During the predetermined period during which the timer 36 operates, the reset signal detector 35-4 detects whether a reset signal is received via the first connection terminal (the D+ terminal) as indicated by the control signal TCNT (S130).

When the USB host 20 uses the third data transfer protocol, a signal received via the connection terminal (the D+ terminal) during the predetermined period does not transition to low but remains logically "high". In other words, the reset signal is not received during the predetermined period of time, and therefore, the reset signal detector 35-4 outputs the detection signal DET at a first level (e.g., one of either a high or low) to the CPU 37.

The CPU 37 generates a control signal for disabling the first interface 32-1 and the second interface 32-2 in response to the detection signal DET at the first level. As a result, the first interface 32-1 and the second interface 32-2 are disabled and the USB attachment sequence (or USB mode sequence) and the IC-USB attachment sequence (or IC-USB mode sequence) are terminated (S135). Accordingly, the first and second interfaces 32-1 and 32-2 do not consume power.

When the USB host 20 uses the USB data transfer protocol, a signal received via the first connection terminal (the D+ terminal) during the predetermined period of time transitions to low, as shown in FIG. 2. In other words, the reset signal is received via the connection terminal (the D+ terminal) during the predetermined period of time, and therefore, the reset signal detector 35-4 outputs the detection signal DET at a second level (e.g., the other one of either high or low) to the CPU 37.

The CPU 37 reads and analyzes the voltage level information generated by the voltage level detector 33 in response to the detection signal DET at the second level in (S140). The CPU 37 generates a control signal for enabling the first interface 32-1 and disabling the second interface 32-2 according to the voltage level information corresponding to 5.0 V (S150).

As a result, the CPU 37 selects a USB mode sequence (S160), so that the USB host 20 can access the USB core 35B through the first interface 32-1 which is enabled. Accordingly, the USB host 20 can transmit data to or receive data from the memory 35-3 through the first interface 32-1 and the memory controller 35-2.

When the USB host 20 uses the IC-USB data transfer protocol, a signal received via the first connection terminal (the D+ terminal) during the predetermined period of time transitions to low. In other words, the reset signal is received during the predetermined period of time, and therefore, the reset signal detector 35-4 outputs the detection signal DET at the second level to the CPU 37.

The CPU 37 reads and analyzes the voltage level information generated by the voltage level detector 33 in response to the detection signal DET at the second level (S140). The CPU 37 generates a control signal for disabling the first interface 32-1 and enabling the second interface 32-2 according to the voltage level information corresponding to 1.0, 1.2, 1.5, 1.8 or 3.0 V (S150).

As a result, the CPU 37 selects an IC-USB mode sequence in operation S170, so that the USB host 20 can access the USB core 35B through the second interface 32-2 which is enabled. Accordingly, the USB host 20 can transmit data to or receive data from the memory 35-3 through the second interface 32-2 and the memory controller 35-2.

As described above, the USB device 30B disables the first and second interfaces 32-1 and 32-2 according to whether the reset signal is received via a connection terminal (the D+ terminal) during the predetermined period of time. In addition, the USB device 30B enables either of the first and second interfaces 32-1 and 32-2 according to whether the reset signal is received via the connection terminal (the D+ terminal) during the predetermined period of time and the level of the voltage received through the $V_{BUS}$ terminal.

Consequently, the USB device 30B may readily identify a data transfer protocol used by the USB host 20 and select an appropriate interface for the data transfer protocol used by the USB host 20 from among multiple available interfaces according to a recognition result.

According to certain embodiments of the present inventive concept, a multi-interface memory card may readily recognize a data transfer protocol supported by a host according to the level of a power-on voltage provided by the host and the presence/absence of a reset signal output from the host and select an interface from among multiple available interfaces according to a recognition result.

While the present inventive concept has been particularly shown and described with reference to exemplary embodiments thereof, it will be understood by those of ordinary skill in the art that various changes in forms and details may be made therein without departing from the scope of the following claims.

What is claimed is:

1. An operating method for a multi-interface memory card, the method comprising:
   detecting a level of a power-on voltage received from a host and generating corresponding voltage level information;
   analyzing the voltage level information in response to a reset signal received from the host and providing an analysis result; and
   enabling one of a plurality of interfaces controlling communication between the multi-interface memory card and the host in accordance with the analysis result.

2. The method of claim 1, wherein the power-on voltage is received at a $V_{BUS}$ terminal of the multi-interface memory card via a universal serial bus (USB) connection,
   the reset signal is received via a connection terminal of the host; and
   analyzing the voltage level information comprises comparing the voltage level information with reference voltage level information.

3. The method of claim 2, wherein the connection terminal is a D+ terminal.

4. The method of claim 1, wherein the plurality of interfaces comprises a first interface supporting a USB data transfer protocol and a second interface supporting an inter-chip USB (IC-USB) data transfer protocol.

5. The method of claim 1, wherein the multi-interface memory card is an integrated circuit (IC) card having a body shaped like a credit card.

6. The method of claim 1, wherein the multi-interface memory card is one of a subscriber identity module (SIM) card, a universal subscriber identity module (USIM) card.

7. The method of claim 1, wherein the multi-interface memory card comprises a non-volatile memory and the method further comprises:
   communicating data between the host and the memory via the enabled one of the plurality of interfaces.

8. The method of claim 4, further comprising:
   counting a predetermined period of time in response to an applied clock signal;
   determining whether the reset signal is received from the host during the predetermined period of time; and
   when the reset signal is not received during the predetermined period of time, disabling both of the first interface and the second interface, else when the reset signal is received during the predetermined period of time, analyzing the voltage level information in response to the reset signal and enabling one interface among the first interface and the second interface according to an analysis result.

9. The method of claim 8, wherein generating the corresponding voltage level information comprises:
   detecting the level of the power-on voltage received via a $V_{BUS}$ terminal and generating the voltage level information according to a detection result; and
   enabling the one of the plurality of interfaces comprises:
   comparing the voltage level information with reference voltage level information in response to the reset signal received via a D+ terminal of the host; and
   enabling one of the first interface and the second interface according to a comparison result.

10. The method of claim 8, wherein the counting the predetermined period of time comprises counting the predetermined period of time using a timer operating in response to the applied clock signal.

11. A multi-interface memory card comprising:
    a first interface configured to support a first data transfer protocol;
    a second interface configured to support a second data transfer protocol;
    a voltage level detector configured to detect a level of a power-on voltage received from a host via a universal serial bus (USB) connection, and generate corresponding voltage level information;
    a reset signal detector configured to detect a reset signal received from the host via the USB connection and generate a detection signal; and
    a central processing unit (CPU) configured to compare the voltage level information with reference voltage level information in response to the detection signal and enable one of the first interface and the second interface according to a result of the comparison between the voltage level information and the reference voltage level.

12. The multi-interface memory card of claim 11, wherein the power-on voltage is received from a $V_{BUS}$ terminal of the host via the USB connection, and the reset signal detector receives the reset signal via a D+ terminal of the host.

13. The multi-interface memory card of claim 11, wherein the first interface supports a USB data transfer protocol and the second interface supports an inter-chip USB (IC-USB) data transfer protocol.

14. The multi-interface memory card of claim 11, wherein the multi-interface memory card is one of a subscriber identity module (SIM) card and a universal subscriber identity module (USIM) card.

15. The multi-interface memory card of claim 11, further comprising:
    a counter configured to count a predetermined period of time in response to an applied clock signal, wherein the reset signal detector determines whether the reset signal is received during the predetermined period of time and generates the detection signal, and
    the CPU disables the first interface and the second interface in response to the detection signal indicating that the reset signal is not received during the predetermined period of time.

16. The multi-interface memory card of claim 15, further comprising:
    a power on reset circuit configured to compare the level of the power-on voltage with a reference voltage level and generate a power on reset signal,
    wherein the CPU and the counter are initialized in response to the power on reset signal.

17. A method of operating a multi-interface memory card including a first interface supporting a universal serial bus (USB) data transfer protocol and a second interface supporting an inter-chip USB (IC-USB) data transfer protocol, the method comprising:
- selecting one of the first interface and the second interface to facilitate data communication between the multi-interface memory card and a host connected to the multi-interface memory card via a USB connection by:
  - receiving a power-on voltage in the multi-interface memory card from the host,
  - comparing in the multi-interface memory card a level of the power-on voltage with a reference voltage level, and
  - thereafter determining in the multi-interface memory card whether a reset signal has been received from the host, and
  - only upon receiving the reset signal during a predetermined period of time, selecting the one of the first interface and the second interface.

18. The method of claim 17, further comprising:
- communicating data between the multi-interface memory card and the host via the USB connection using the one of the first interface and the second interface.

19. The method of claim 17, wherein the power-on voltage is received via the USB connection at a $V_{BUS}$ terminal of the multi-interface memory card.

\* \* \* \* \*